UNITED STATES PATENT OFFICE.

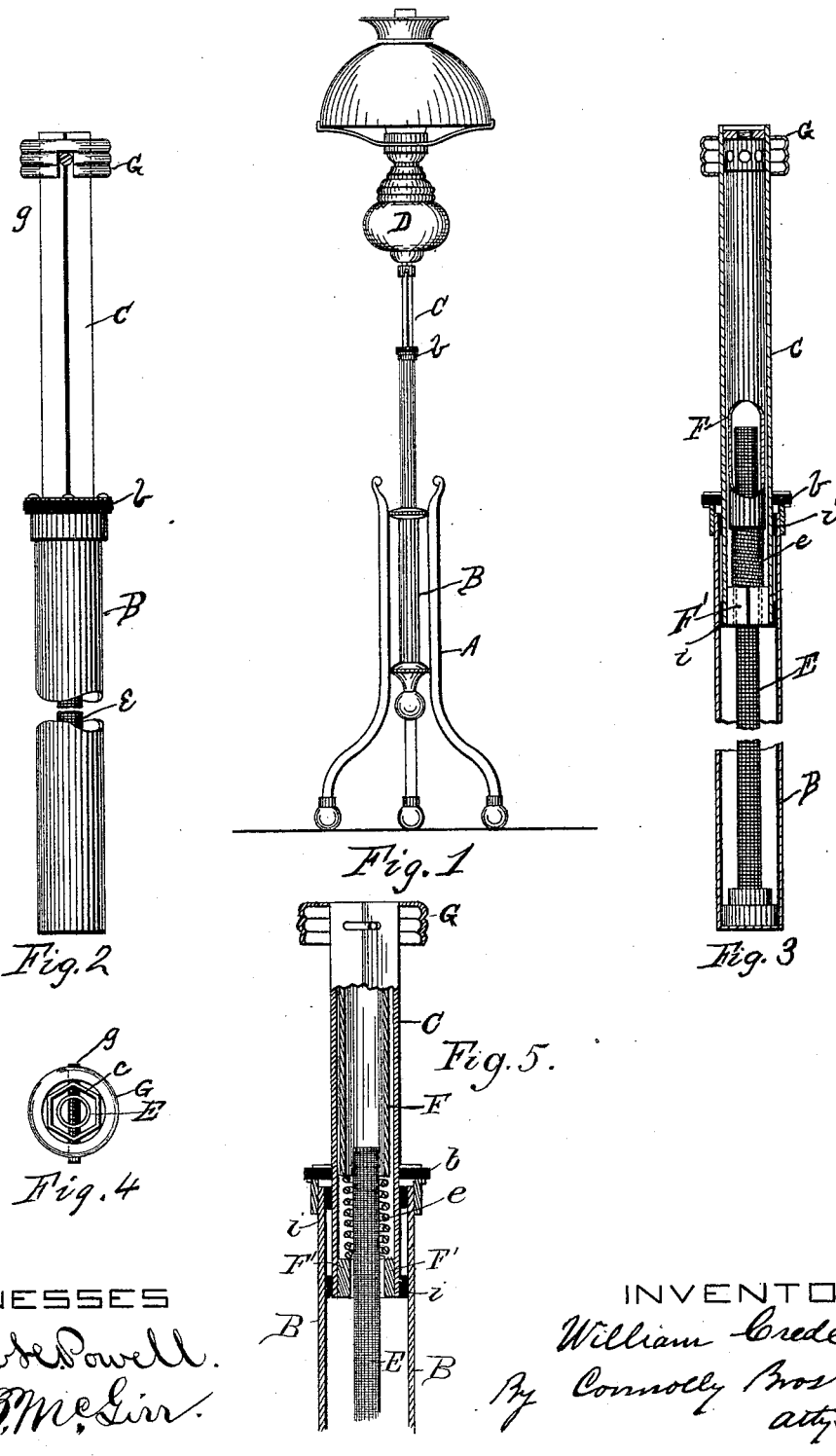

WILLIAM CREDE, OF PHILADELPHIA, PENNSYLVANIA, ASSIGNOR TO THE HORN, BRANNEN & FORSYTH MANUFACTURING COMPANY, OF SAME PLACE.

EXTENSION PEDESTAL-LAMP.

SPECIFICATION forming part of Letters Patent No. 389,445, dated September 11, 1888.

Application filed April 19, 1887. Serial No. 235,377. (No model.)

*To all whom it may concern:*

Be it known that I, WILLIAM CREDE, a subject of the Emperor of Germany, residing at Philadelphia, in the county of Philadelphia and State of Pennsylvania, have invented certain new and useful Improvements in Extension Pedestal-Lamps; and I do hereby declare the following to be a full, clear, and exact description of the invention, reference being had to the accompanying drawings, which form part of this specification.

This invention has relation to extension pedestal-lamps, and has for its object the provision of novel means for the adjustment and support of the sliding rod or stem upon which are mounted the lamp and appurtenances.

My invention contemplates the provision of devices whereby the raising and lowering of the sliding stem may be effected easily and conveniently without danger of injury to the lamp-fixtures, and whereby the sliding stem and surrounding parts may be firmly supported at any point to which they are adjusted.

In carrying my invention into effect I fit upon the sliding stem a rotary collar. This collar is connected by a pin or screw with a tube located inside the stem or extension-rod and connected at its lower end with a short coiled spring fastened at its lower terminal to a nut fitting within the stem at its base. A vertical rod attached to the base of the lamp-stem and having its surface roughened or threaded enters the internal tube through the nut and coiled spring and is embraced by the latter. The tension of the spring, which is normally contracted, produces a sufficient purchase on the roughened or threaded rod to firmly support and sustain the extensible stem and surmounting lamp and prevent any movement thereof. When, however, the collar is turned slightly, the spring expands and allows the stem to be raised or lowered, but still exerts sufficient pressure on the rod to prevent the lamp from dropping or descending unless actually drawn or pressed down by hand.

My invention consists, then, in the combination, with the hollow pedestal or stand and the adjustable stem of an extension-lamp, of a rotary collar applied to the stem and connected to an internal clamping or brake mechanism by which the extension-rod and surmounting parts are rendered adjustable and are prevented from dropping or descending accidentally.

In the accompanying drawings, Figure 1 is an elevation of the pedestal-lamp provided with my improvements. Fig. 2 is a side view, on an enlarged scale, of the sliding stem and rotary collar and a portion of the tubular stem or pedestal. Fig. 3 is a vertical central section, on an enlarged scale, of the same, showing the internal clamp or brake mechanism. Fig. 4 is a horizontal section through the upper part of Fig. 2. Fig. 5 is a vertical central section through the pedestal and extension attachments, the same being on the same scale as Figs. 2 and 3.

My improvements are applicable to pedestal-lamps of any approved pattern.

A designates the foot or base of the lamp-stand, B the tubular pedestal, C the extension rod or stem, and D the lamp supported upon top of the stem. The stem C is of tubular form and is hexagonal, square, or of other suitable shape or construction to prevent it from turning in the pedestal, while the latter is provided with a cap or collar, $b$, having a corresponding aperture, through which the stem slides. To provide for an easy movement of the stem within the pedestal, the former has soldered to it one or more cylindrical bands or collars, $i$, which slide upon the smooth inner surface of the pedestal.

Within the pedestal, and fastened thereto in any suitable manner, is a vertical rod, E, which rises some distance above the top of the pedestal, and is grooved, threaded, or roughened on its surface to afford a purchase for the coiled spring $d$.

Within the stem or rod C is fitted a tube, F, and a nut, F', the latter being rigidly fastened in place, so as to be incapable of rotation with the tube F. Between the tube F and nut is arranged a coiled spring, $e$, through which and through the nut F' the rod E passes. The spring $e$ is of a size and strength to normally bind the rod E tightly, and, by reason of the roughened surface of the latter, the spring affords a secure fastening, which will prevent the spring from sliding or slipping on the rod and prevent the extension-stem from being raised or lowered. The tube F, however is capable of being slightly turned or rotated, and for the purpose of adjustment is connected at its upper end to the collar G, which encircles the extension-stem, as shown, by means of a screw or pin, g, passing through a horizontal slot in the wall of the stem. When the spring is contracted and is binding the rod E, the pin g lies against one end of the slot. Now, by turning the collar slightly in a horizontal direction the tube F will be turned and the coils of the spring partly opened, thus diminishing their hold on the rod E, whereupon the stem C may be easily raised or lowered by the exertion of a slight vertical pressure on the collar in the required direction.

If the lamp be already elevated, the loosening of the spring by the rotation of the collar does not entirely release it from the rod E, as there always remains sufficient pressure or purchase to support the extension-rod and lamp and prevent them from dropping or descending accidentally or unless actually pressed down. When, however, the collar is turned, the adjustment of the extension rod or stem is easy, and very little force is required to effect a movement. When the collar is released, it returns to its normal position automatically by the contraction of the spring, which resumes its binding and purchase on the rod E.

Having described my invention, what I claim, and desire to secure by Letters Patent, is—

1. In an extension pedestal-lamp, the combination, with the hollow or tubular pedestal and the tubular extension-stem, of a rotary inner tube, a stationary rod located within the pedestal, a rotary collar connected to said inner tube, and an intermediate clamp connected to said inner tube and said stem and having a purchase on said rod, substantially as described.

2. In an extension pedestal-lamp, the combination of the tubular pedestal B, threaded or roughened rod E, stationary nut F', spring e, rotary tube F, slotted extension-rod C, collar G, and connecting pin or screw g, substantially as described.

In testimony that I claim the foregoing I have hereunto set my hand this 16th day of April, 1887.

WILLIAM CREDE.

Witnesses:
WILL H. POWELL,
R. DALE SPARHAWK.